United States Patent
Ash et al.

[11] Patent Number: 5,152,479
[45] Date of Patent: Oct. 6, 1992

[54] EJECTION SEATS FOR MILITARY AIRCRAFT

[75] Inventors: Geoffrey J. Ash; Timothy S. Valentine, both of Preston, England

[73] Assignee: British Aerospace Public Limited Company, London, England

[21] Appl. No.: 648,987

[22] Filed: Jan. 31, 1991

[30] Foreign Application Priority Data

Apr. 10, 1990 [GB] United Kingdom ............... 9008045

[51] Int. Cl.⁵ .......................................... B64D 25/115
[52] U.S. Cl. ......................... 244/122 R; 244/122 AG; 297/115
[58] Field of Search ....... 244/122 A, 122 R, 122 AG, 244/122 AD; 297/115, 417, 418

[56] References Cited

U.S. PATENT DOCUMENTS

| | | | |
|---|---|---|---|
| 2,985,413 | 5/1961 | von Beckh Widmanstetter | 244/144 |
| 3,580,636 | 5/1971 | Sette | 297/417 |
| 3,826,434 | 7/1974 | Von Beckh | 244/122 R |
| 3,981,465 | 9/1976 | Sinnett et al. | 244/122 |
| 4,097,088 | 6/1978 | Meiller | 297/115 X |
| 4,301,983 | 11/1981 | Horan | 244/122 AG |
| 4,613,101 | 9/1986 | Herndon | 244/122 |
| 4,667,901 | 5/1987 | Herndon | 244/122 |
| 4,702,520 | 10/1987 | Whisler et al. | 297/115 X |
| 4,763,860 | 8/1988 | Vauvelle | 244/122 R |
| 4,787,576 | 11/1988 | McGrady et al. | 244/122 R |
| 4,914,976 | 4/1990 | Wyllie | 74/523 |

FOREIGN PATENT DOCUMENTS

| | | |
|---|---|---|
| 640520 | 7/1947 | United Kingdom . |
| 761507 | 9/1953 | United Kingdom . |
| 753428 | 9/1954 | United Kingdom . |
| 813692 | 5/1959 | United Kingdom . |

Primary Examiner—Charles A. Marmor
Assistant Examiner—Carla Mattix
Attorney, Agent, or Firm—Nixon & Vanderhye

[57] ABSTRACT

A reclining ejection seat (1) for an aircraft which includes an arm support (7) composed of two parts (8,10) which are moveable fore and aft. A first part (8) carries flying controls (9) and is adjustable for reach. A second part (10) which is adjustable for comfort, locates the elbow of a pilot (11) and supports his forearm. The arm support (7) permits the pilot (11) to maintain adequate control over his arm movements even when the aircraft is carrying out very high speed maneuvers.

4 Claims, 1 Drawing Sheet

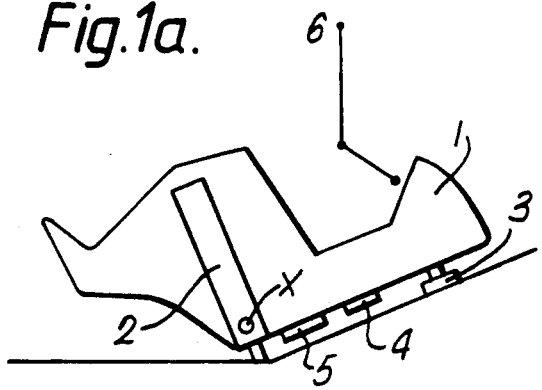
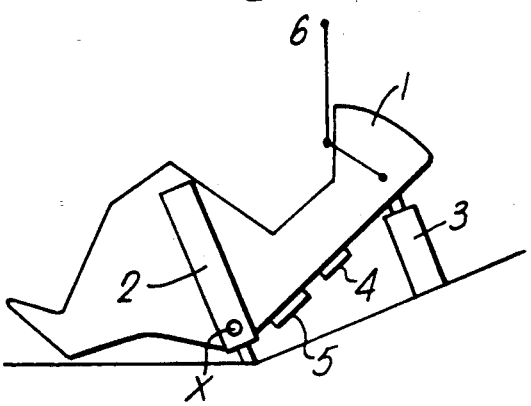
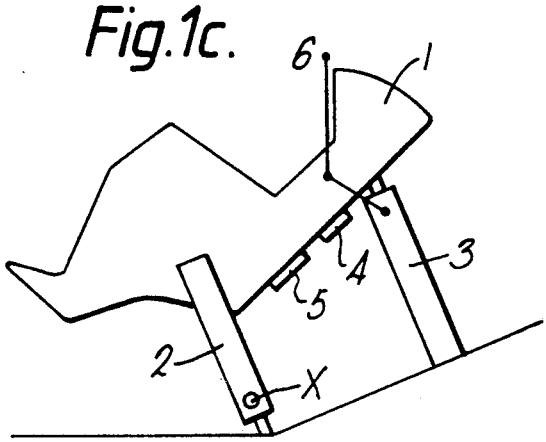
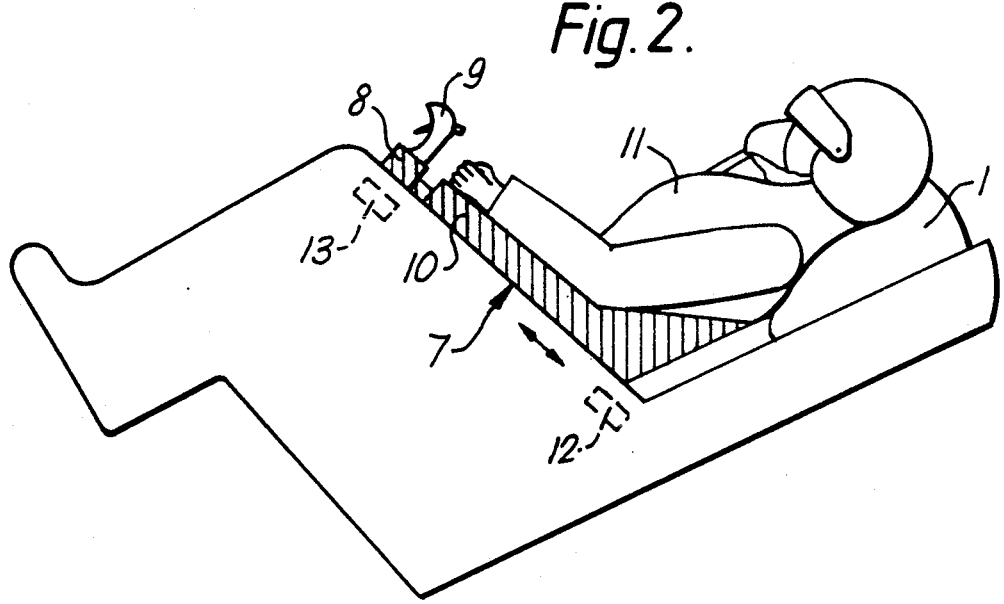

EJECTION SEATS FOR MILITARY AIRCRAFT

BACKGROUND OF THE INVENTION

1. Field of the Invention

This invention relates to improvements in cockpits for military aircraft and in particular, to improvements which protect the pilot of such an aircraft from the adverse effects of high 'g' forces.

2. Discussion of Prior Art

It has been found that when an aircraft is carrying out manoeuvres involving forces of more than 8g the pilot needs to be in an almost supine position if he is to remain conscious (even when wearing the conventional 'g' suit).

Ejection seats which are moveable from an upright position to a reclining position have been proposed for use in high speed aircraft. See, for example, U.S. Pat. No. 3,981,485. For most flying operations, the pilot selects the upright position. For high-speed manoeuvres, he reclines the seat so that his tolerance to 'g' forces is improved.

The inventors have found that whilst in a supine position and under high 'g' conditions, the pilot has appreciable difficulty controlling his arm movements and, consequentially, operating the manual flying controls.

SUMMARY OF THE INVENTION

It is an object of this invention to provide an arm support for the pilot so that he can execute the necessary control over the manual flying controls when carrying out high speed manoeuvres.

Thus the invention comprises an ejection seat for a pilot of an aircraft in which the seat incorporates a support for the pilot's elbow and forearm, said support being adjustable fore and aft.

Optionally, the support may carry aircraft control levers such as the throttle, stick and rudder pedals, all of which may be adjustable for reach.

BRIEF DESCRIPTION OF THE DRAWINGS

Some embodiments of the invention will now be described, by way of example only, with reference to the drawings of which:

FIG. 1(a), (b) and (c) shows three side views of an ejection seat (incorporating an arm support in accordance with the invention) in three different positions of deployment; and FIG. 2 is further side view of the ejection seat of FIG. 1 (a).

DETAILED DISCUSSION OF PREFERRED EMBODIMENTS

FIG. 1 shows and ejection seat 1 having one pair of guide rails 2 located either side of the seat (only one rail being shown here for clarity), a pyrotechnic ram device 3, an electric motor 4 for rotating the seat about a point X and an ejection gun 5.

The pyrotechnic ram 3 is provided as an additional energy source in order to produce a force to act with the gun 5 on an escape sequence at any instance before, during and after articulation of the seat. The ram 3 works on a ratchet device (not shown) in order to provide anchorage to the ram 3 so enabling a firm reaction during the escape sequence.

The locus of the pilot's eye 6 is shown for each of three positions (a), (b) and (c) of the seat 1. Position (a) shows the seat in a fully reclining position at approximately 65° to the vertical, (b) shows the seat rotated through approximately 21° to a more upright, intermediate position, and (c) shows the seat raised on its guide rails 2 without any further rotation from position (b). This last function serves to give adjustment for the full range of aircrew 3%ile to 99%ile to a common eye datum with an external view.

Position (a) is chosen by the pilot for maximum 'g' protection when sustaining high 'g' manoeuvres. Whilst in this reclining position, and unable to see through the windshield the pilot deploys a head-down display (not shown) comprising two panels which fold outward away from the pilot's line of sight when not required. The panels display computer generated images of geographical features and data which relate to the area over which the pilot is flying. Methods of generating images suitable for this purpose are described in our co-pending UK patent application No.8912026.

When the seat 1 is in its most upright position corresponding to position (c) in FIG. 1, the pilot uses a conventional head-up display (not shown). In this position, the pilot is permitted a 20° field of view in elevation through the windshield.

The design philosophy of the ejection seat described above with reference to FIGS. 1 and 2 is a complete departure from the conventional method of raising or lowering the seating platform to achieve a common eye datum, irrespective of size of pilot. The eye datum is not now considered as critical with the seat reclined and no external view being possible. Furthermore, the need to raise and lower the seat in order to reach and operate control and the ability for the pilot to rotate his arm about the shoulder are no longer relevant. An anthropometric survey concluded that the pilot's elbow would have to be located into the corner of an armrest so that adequate support for the forearm at very high 'g'values could be provided. The survey also concluded that the armrest should be adjustable fore and aft to accommodate pilots of different size. The range of adjustment within the survey was found to be 66 mm of fore and aft movement.

The above findings are embodied in the seat of FIG. 2. The seat 1 incorporates an arm rest 7 composed of a first part 8 on which are mounted aircraft control levers 9, and a second part 10 which supports the elbow and forearm of a pilot 11. The first and second parts of the arm rest (8,10) can be moved independently of one another relative to the remainder of the seat 1, in a fore and aft direction (as shown by the arrows in FIG. 2). The pilot 11 firstly adjusts the second part 10 so that his elbow is comfortably located. Adjustment is achieved by means of an electric motor 12. Next, the pilot 11 adjusts the first part 8 of the arm rest 7 so that he can comfortably reach and operate the controls 9. Adjustment is effected by an electric motor 13.

An armrest as described above can provide adequate support for the forearm under high 'g'conditions and thus enable the pilot to operate the manual flying controls with the required accuracy.

I claim:

1. An ejection seat for a pilot of an aircraft, said pilot having an elbow and forearm, said seat incorporates:
   a seat rest;
   back rest; and
   at least one arm rest, said arm rest including;

means for providing location support for said pilot elbow and for supporting said pilot forearm while said pilot is flying the aircraft; and means for adjusting the position of said arm rest relative to said back rest and said seat rest in a direction substantially along a fore and aft direction of said arm rest.

2. An ejection seat according to claim 1 in which said arm rest includes a remainder portion and a movable portion, movable with respect to said remainder portion, and aircraft control levers mounted on said movable portions.

3. An ejection seat according to claim 1 in which said means for adjusting the position of said arm rest is an electric motor.

4. An ejection seat according to claim 2 wherein said means for adjusting includes an electric motor means for adjusting said movable portion including said aircraft control levers relative to said remainder portion.

* * * * *